(12) United States Patent
Tsukamoto et al.

(10) Patent No.: US 9,931,902 B2
(45) Date of Patent: Apr. 3, 2018

(54) STABILIZER BUSHING AND STABILIZER-BAR MOUNTING DEVICE

(71) Applicant: TOYOTA JIDOSHA KABUSHIKI KAISHA, Toyota-shi, Aichi-ken (JP)

(72) Inventors: Masahiro Tsukamoto, Toyota (JP); Satoshi Uchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 15/063,848

(22) Filed: Mar. 8, 2016

(65) Prior Publication Data

US 2016/0303939 A1 Oct. 20, 2016

(30) Foreign Application Priority Data

Apr. 16, 2015 (JP) ................................ 2015-084202
Dec. 1, 2015 (JP) ................................ 2015-234453

(51) Int. Cl.
*B60G 21/055* (2006.01)

(52) U.S. Cl.
CPC .... *B60G 21/0551* (2013.01); *B60G 2202/135* (2013.01); *B60G 2204/1222* (2013.01); *B60G 2204/41* (2013.01)

(58) Field of Classification Search
CPC .............. B60G 21/055; B60G 21/0551; B60G 21/0553; B60G 21/0555; B60G 21/0556; B60G 21/0558; B60G 2202/135; B60G 2202/1351; B60G 2204/1222; B60G 2204/1224; B60G 2204/1226; B60G 2204/41

USPC ..... 248/596, 205.1, 58, 61–63, 65, 67.5, 72, 248/73, 74.1, 74.2, 74.3, 74.4
See application file for complete search history.

(56) References Cited

U.S. PATENT DOCUMENTS

| 6,685,381 B1 * | 2/2004 | Sugita ...................... B60G 9/00 280/124.152 |
| 7,296,786 B2 * | 11/2007 | Hees ........................ B60G 7/02 267/140.3 |
| 7,318,593 B2 * | 1/2008 | Sterly ................ B60G 21/0551 267/189 |

(Continued)

FOREIGN PATENT DOCUMENTS

| JP | H08-244431 A | 9/1996 | |
| JP | 11192828 A | * 7/1999 | ......... B60G 21/0551 |

(Continued)

*Primary Examiner* — Nkeisha Smith
(74) *Attorney, Agent, or Firm* — Oliff PLC

(57) ABSTRACT

A stabilizer bushing has a holding hole for holding a stabilizer bar and is to be mounted on a mounting surface of a vehicle-body-side component. A normal line to the mounting surface extends in a direction intersecting an up and down direction of a vehicle. The stabilizer bushing has at least one separation surface, one end portion of which is located on an inner circumferential surface opposed to the holding hole, and the other end portion of which is located on an outer surface of the stabilizer bushing at a position different from a rigid-component opposed portion opposed to the vehicle-body-side component. The at least one separation surface has a first separation surface located nearer to the rigid-component opposed portion than a plane extending through a central axis of the holding hole and parallel with the rigid-component opposed portion.

8 Claims, 5 Drawing Sheets

(56) References Cited

U.S. PATENT DOCUMENTS

| | | | |
|---|---|---|---|
| 7,380,775 B2* | 6/2008 | Niwa | B60G 21/0551 |
| | | | 267/293 |
| 8,505,940 B1* | 8/2013 | Hufnagle | B60G 21/0551 |
| | | | 280/124.13 |
| 9,004,511 B1* | 4/2015 | Rosepiler | B60G 21/0551 |
| | | | 280/124.109 |
| 9,677,636 B2* | 6/2017 | Nakamura | F16F 1/3605 |
| 2004/0070161 A1* | 4/2004 | Fader | B60G 21/0551 |
| | | | 280/124.166 |
| 2011/0170814 A1* | 7/2011 | Nakamura | B60G 21/0551 |
| | | | 384/125 |
| 2011/0175269 A1* | 7/2011 | Harada | F16F 1/3835 |
| | | | 267/293 |
| 2013/0028543 A1* | 1/2013 | Kang | B60G 21/0551 |
| | | | 384/13 |
| 2016/0257178 A1* | 9/2016 | Higuchi | F16F 15/08 |
| 2017/0008365 A1* | 1/2017 | Tsukamoto | B60G 21/0551 |
| 2017/0080772 A1* | 3/2017 | Matsumura | B60G 21/0551 |

FOREIGN PATENT DOCUMENTS

| | | |
|---|---|---|
| JP | 2005-193901 A | 7/2005 |
| JP | 2006-273181 A | 10/2006 |
| JP | 2007-127239 A | 5/2007 |
| JP | 2008-049813 A | 3/2008 |
| JP | 2011-148347 A | 8/2011 |
| JP | 2011-168102 A | 9/2011 |
| WO | 2011/102373 A1 | 8/2011 |

* cited by examiner

B: VERTICAL FORCE
RECEIVING PORTION
(B-1) + (B-2) → B

S: INNER VERTICAL-FORCE
RECEIVING PORTION
(S-1) + (S-2) → S

R1: RIGID-COMPONENT
OPPOSED PORTION
R2: NARROW-PORTION
OPPOSED PORTION
(R2-1) + (R2-2) → R2
R3: OUTER VERTICAL-FORCE
RECEIVING PORTION
(R3-1) + (R3-2) → R3

STABILIZER BUSHING AND STABILIZER-BAR MOUNTING DEVICE

CROSS REFERENCE TO RELATED APPLICATION

The present application claims priority from Japanese Patent Application Nos. 2015-084202 filed on Apr. 16, 2015, and 2015-234453 filed on Dec. 1, 2015, the contents of which are incorporated herein by reference.

BACKGROUND

Technical Field

The following disclosure relates to a stabilizer bushing used for mounting of a stabilizer bar on a vehicle body and to a stabilizer-bar mounting device including the stabilizer bushing.

Description of the Related Art

Patent Document 1 (Japanese Patent Application Publication No. 2007-127239) discloses a stabilizer bushing (hereinafter may be simply referred to as "bushing") which is constituted by two parts. A stabilizer bar held by this bushing is mounted by a bracket on a mounting surface of a vehicle-body-side component. The normal line to the mounting surface extends in an up and down direction of a vehicle. The two parts are mounted in contact with each other at an inclined surface that is inclined obliquely upward from an inner circumferential side toward an outer circumferential side of the bushing.

Patent Document 2 (Japanese Patent Application Publication No. 2005-193901), Patent Document 3 (Japanese Patent Application Publication No. 2006-273181), Patent Document 4 (Japanese Patent Application Publication No. 2008-49813), and Patent Document 5 (Japanese Patent Application Publication No. 8-244431) disclose bushings having a dividing surface, as a separation surface, which extends over the entire length of the bushing in its axial direction. The bushing is opened from this dividing surface toward opposite sides thereof and mounted on a stabilizer bar.

Patent Document 2 discloses a bushing having a dividing surface protruding in its axial direction. End portions of this dividing surface are located on an outer surface of the bushing at positions opposed to the vehicle-body-side component. Patent Documents 3, 4 disclose bushings having a dividing surface extending in a front and rear direction. Patent Document 5 discloses a bushing having a dividing surface that is inclined obliquely upward from a holding hole toward an outer surface of the bushing.

SUMMARY

Accordingly, an aspect of the disclosure relates to improvement of a stabilizer bushing having at least one separation surface and a stabilizer-bar mounting device including the stabilizer bushing, with reduction in lowering of durability of the stabilizer bushing.

In one aspect of the disclosure, a stabilizer bushing is to be mounted on a mounting surface of a vehicle-body-side component. A normal line to the mounting surface extends in a direction intersecting an up and down direction of a vehicle. The stabilizer bushing has at least one separation surface. One end portion of the at least one separation surface is located on an inner circumferential surface opposed to a holding hole in a state in which the stabilizer bushing is mounted on the vehicle-body-side component. The other end portion of the at least one separation surface is located on an outer surface of the stabilizer bushing at a position different from a rigid-component opposed portion opposed to the vehicle-body-side component in the state in which the stabilizer bushing is mounted on the vehicle-body-side component.

The stabilizer bushing has the at least one separation surface. When the at least one separation surface is a single separation surface, the stabilizer bushing is openable at the separation surface. When the at least one separation surface is a plurality of separation surfaces, the stabilizer bushing is divided into a plurality of partial bushings. Thus, the stabilizer bushing can be easily mounted on the outer circumferential surface of the stabilizer bar, regardless of whether the at least one separation surface is a single separation surface or a plurality of separation surfaces. Although the shapes of the respective partial bushings are determined by the separation surface or surfaces, the partial bushings are not always manufactured by cutting the stabilizer bushing along the separation surface or surfaces.

The other end portion of the at least one separation surface is located at the position different from the rigid-component opposed portion. This construction prevents the bushing from being opened at, e.g., the other end portion of the at least one separation surface due to a force received by the rigid-component opposed portion from the vehicle-body-side component in the case where the stabilizer bar is mounted on the vehicle-body-side component by the bracket via the bushing. As a result, it is possible to reduce lowering of the durability of the bushing due to formation of the separation surface.

CLAIMABLE INVENTIONS (1) A stabilizer bushing, comprising:
a holding hole extending in an axial direction of the stabilizer bushing,
wherein the stabilizer bushing is configured to hold a stabilizer bar in the holding hole,
wherein the stabilizer bushing is to be mounted on a mounting surface of a vehicle-body-side component,
wherein a normal line to the mounting surface extends in a direction intersecting an up and down direction of a vehicle, and
wherein the stabilizer bushing comprises at least one separation surface formed at an area different from an up-down-force receiving portion determined based on an up-down central plane that extends in the up and down direction and that comprises a central axis extending in the axial direction through a center of the holding hole, in a state in which the stabilizer bushing is mounted on the vehicle-body-side component.

The up-down-force receiving portion is an area where the distance between any point in this up-down-force receiving portion and the up-down central plane is less than or equal to a set distance. For example, the up-down-force receiving portion may receive an up-down force greater than or equal to a set value (e.g., the magnitude which may cause deformation of the separation surface) due to a twist of the stabilizer bar.

In the case where the holding hole has a substantially round shape, and the center of the holding hole corresponds to the center of the stabilizer bar, the central axis corresponds to the central axis of the holding hole, the up-down central plane may be referred to as "up-down center surface". In contrast, in the case where the holding hole does not have a substantially round shape or in the case where the center of the holding hole does not correspond to the center of the stabilizer bar, for example, a line extending in the axial direction through a point in the holding hole which corresponds to the center of the stabilizer bar held in the holding hole is referred to as "central axis".

(2) The stabilizer bushing according to the above form (1),
wherein each of the at least one separation surface extends over an entire length of the stabilizer bushing in the axial direction, and
wherein the one end portion of each of the at least one separation surface is located on an inner circumferential surface opposed to the holding hole, at a position different from an inner up-down-force receiving portion determined based on the up-down central plane.

The separation surface of the stabilizer bushing (hereinafter may be simply referred to as "bushing") extends over the entire length of the bushing in its axial direction, that is, the separation surface extends to an outer surface of the bushing and to the inner circumferential surface of the bushing which defines the holding hole. In the state in which the stabilizer bar is held in the holding hole of the bushing, a large force acts on the inner up-down-force receiving portion of the bushing from the stabilizer bar by a twist of the stabilizer bar. Thus, the separation surface is preferably formed in a state in which the one end portion is located at a position different from the inner up-down-force receiving portion, in other words, at a position spaced apart from the up-down central plane by greater than or equal to the set distance. It is noted that the up-down-force receiving portion may contain the inner up-down-force receiving portion.

(3) The stabilizer bushing according to the above form (2), wherein the other end portion of each of the at least one separation surface is located on an outer surface at a position different from an outer up-down-force receiving portion determined based on the up-down central plane.

The outer up-down-force receiving portion of the bushing receives a large vertical reaction force from the bracket due to the twist of the stabilizer bar. Thus, the separation surface is formed in a state in which the other end portion is located at a position different from the outer up-down-force receiving portion. The up-down-force receiving portion may contain the outer up-down-force receiving portion.

(4) The stabilizer bushing according to the above form (2) or (3), wherein each of the at least one separation surface is formed in a state in which the other end portion is located on an outer surface at a position different from a rigid-component opposed portion opposed to the vehicle-body-side component.

The bushing is mounted in a state in which the bushing is compressed by the bracket, the vehicle-body-side component, and other components principally in a direction of a normal line to the mounting surface. The vehicle-body-side component applies a large force to a portion of the bushing which is opposed to the vehicle-body-side component. If the separation surface is formed in a state in which the other end portion is located at the rigid-component opposed portion, the bushing may be opened at the separation surface. In the case where the separation surface is formed in the state in which the other end portion is located on the outer surface of the bushing at a position different from the rigid-component opposed portion, in contrast, it is possible to prevent opening of the bushing at the separation surface, resulting in reduction in lowering of the durability of the bushing. In the case where a rigid component (having the rigidity higher than that of the bushing) such as a base is provided between the vehicle-body-side component and the bushing, a portion of the bushing which is opposed to the base serves as the rigid-component opposed portion.

(5) The stabilizer bushing according to any one of the above forms (1) through (4), wherein one of the at least one separation surface extends in a direction perpendicular to the up and down direction.

The separation surface extending in the direction perpendicular to the up and down direction, i.e., the front and rear direction is not easily deformed by an up-down force.

(6) The stabilizer bushing according to any one of the above forms (1) through (5), wherein one of the at least one separation surface protrudes away from the holding hole in the axial direction.

In the case where the separation surface has a portion protruding away from the holding hole (i.e., the up-down central plane) in the axial direction, the separation surface is spaced apart from the up-down-force receiving portion at a greater distance by an amount corresponding to the protrusion. This construction makes it more difficult for a large up-down force to act on the separation surface.

(7) The stabilizer bushing according to any one of the above forms (1) through (6),
wherein the stabilizer bushing is to be mounted on the vehicle-body-side component via a rigid component,
wherein the rigid component comprises a recessed portion formed in an intermediate portion of the rigid component in the axial direction,
wherein the stabilizer bushing comprises a bushing protruding portion protruding in a direction away from the holding hole so as to match the recessed portion of the rigid component, and
wherein one of the at least one separation surface protrudes at a portion thereof which corresponds to the bushing protruding portion.

The protruding portion of the bushing and the recessed portion of the rigid component are mounted on each other so as to face each other. This construction prevents movement of the bushing and the rigid component relative to each other in the axial direction. Also, in the case where the separation surface is bent along the bushing protruding portion so as to protrude away from the holding hole, the separation surface is spaced apart from the stabilizer bar at a greater distance by an amount corresponding to the protrusion. This construction makes it difficult for the separation surface to receive an up-down force due to the twist of the stabilizer bar.

(8) The stabilizer bushing according to any one of the above forms (1) through (7), further comprising a pair of inclined surface portions formed on the outer surface at positions opposed to the vehicle-body-side component,
wherein each of the at least one separation surface is formed in a state in which the other end portion is located at a position different from the pair of inclined surface portions.

(9) The stabilizer bushing according to the above form (8),
wherein the stabilizer bushing is mounted on the vehicle-body-side component in a state in which the stabilizer bushing is accommodated in the recessed portion of the bracket,
wherein the recessed portion of the bracket comprises a narrow portion at an opening portion of the recessed portion, and
wherein the pair of inclined surface portions has a shape corresponding to that of the narrow portion.

(10) The stabilizer bushing according to any one of the above forms (1) through (9), wherein the at least one separation surface is two or more separation surfaces comprised in the stabilizer bushing, and wherein the stabilizer bushing comprises two or more partial bushings defined by the two or more separation surfaces.

The stabilizer bushing includes two or more partial bushings. The partial bushings are mounted in a state in which the partial bushings face each other at the separation surface or surfaces. In this respect, the separation surface may be referred to as "contact surface" and "facing surface".

(11) The stabilizer bushing according to the above form (10), wherein two separation surfaces of the two or more separation surfaces intersect each other at an angle of greater than 90 degrees and less than or equal to 180 degrees.

An outer circumferential surface of the stabilizer bar is covered with the plurality of partial bushings. Thus, the size of each of the partial bushings may be determined with consideration of easiness of mounting of the bushing on the stabilizer bar, easiness of molding of the partial bushings, and other similar elements.

(12) A stabilizer bushing, comprising:
a holding hole extending in an axial direction of the stabilizer bushing,
wherein the stabilizer bushing is configured to hold a stabilizer bar in the holding hole,
wherein the stabilizer bushing is to be mounted on a vehicle-body-side component,
wherein the stabilizer bushing is symmetric with respect to a reference plane extending in a direction intersecting the axial direction,
wherein the stabilizer bushing comprises at least two partial bushings contactable with each other at at least two separation surfaces of the stabilizer bushing, and
wherein the at least two separation surfaces are asymmetric with respect to the reference plane.

The bushing according to this form may incorporate the technical features in any one of the above forms (1) through (11).

(13) A stabilizer bushing, comprising:
a holding hole extending in an axial direction of the stabilizer bushing,
wherein the stabilizer bushing is configured to hold a stabilizer bar in the holding hole,
wherein the stabilizer bushing is to be mounted on a mounting surface of a vehicle-body-side component,
wherein a normal line to the mounting surface extends in a direction intersecting an up and down direction of a vehicle,
wherein the stabilizer bushing comprises at least one separation surface,
wherein one end portion of the at least one separation surface is located on an inner circumferential surface opposed to the holding hole in a state in which the stabilizer bushing is mounted on the vehicle-body-side component,
wherein the other end portion of the at least one separation surface is located on an outer surface of the stabilizer bushing at a position different from a rigid-component opposed portion opposed to the vehicle-body-side component in the state in which the stabilizer bushing is mounted on the vehicle-body-side component, and
wherein the at least one separation surface comprises a first separation surface located nearer to the rigid-component opposed portion than a plane that extends through a central axis of the holding hole and that is parallel with the rigid-component opposed portion.

The bushing according to this form may incorporate the technical features in any one of the above forms (1) through (12).

(14) The stabilizer bushing according to the above form (13), wherein an extended surface extended from the first separation surface is spaced apart from the central axis.

Since the extended surface of the first separation surface is spaced apart from the central axis, it is difficult for the first separation surface to receive a large force from the stabilizer bar.

(15) A stabilizer-bar mounting device, comprising:
a stabilizer bushing according to any one of the above forms (1) through (14); and
a bracket comprising (i) a recessed portion capable of accommodating the stabilizer bushing and (ii) a mount portion that is to be mounted on the vehicle-body-side component.

(16) The stabilizer-bar mounting device according to the above form (15),
wherein the recessed portion of the bracket comprises a pair of opposed portions opposed in a direction perpendicular to the axial direction, and
wherein a distance between portions of the bracket which are nearer to the mount portion than intermediate portions of the pair of opposed portions is less than a distance between the intermediate portions of the pair of opposed portions.

(17) The stabilizer-bar mounting device according to the above form (16),
wherein the bracket comprises a pair of stepped surface portions between (i) the intermediate portions and (ii) the portions of the bracket which are nearer to the mount portion than the intermediate portions of the pair of opposed portions,
wherein a distance between the pair of opposed portions changes at the pair of stepped surface portions,
wherein the stabilizer bushing further comprises a pair of inclined surface portions provided at a portion of the outer surface which corresponds to the pair of stepped surface portions of the bracket in a state in which the stabilizer bushing is accommodated in the recessed portion of the bracket, and
wherein the first separation surface is formed in a state in which the other end portion is located on the outer surface at a position different from the pair of inclined surface portions.

A narrow portion is provided at the portions of the bracket which are nearer to the mount portion than the intermediate portion. This narrow portion makes it difficult for the bushing to be disengaged from the bracket.

Since the bushing is mounted in a state in which the inclined surface portions of the bushing are opposed to the narrow portion of the bracket, the separation surface is preferably formed in a state in which the other end portion is located on the outer surface of the bushing at a position different from the pair of inclined surface portions.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Figure 1:
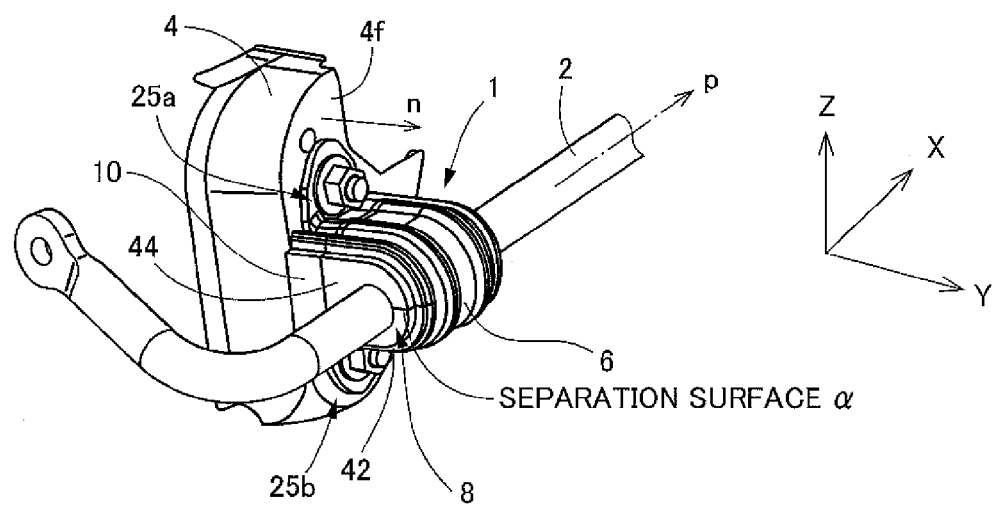
FIG. 1 is a perspective view illustrating a situation in which a stabilizer bar is mounted on a vehicle-body-side component by a bar mounting device according to a first embodiment which includes a bushing according to a first embodiment.

Hereinafter, there will be described a stabilizer-bar mounting device according to one embodiment by reference to the drawings. As illustrated in FIG. 1, the stabilizer-bar mounting device (hereinafter simply referred to as "bar mounting device") 1 is used for mounting a stabilizer bar 2 at its torsion bar on a vehicle-body-side component 4, e.g., a suspension member. The bar mounting device 1 includes a bracket 6, a stabilizer bushing 8 (hereinafter may be referred simply as "bushing") according to one embodiment, and a base 10 disposed between the bushing 8 and the vehicle-body-side component 4.

In FIG. 1, a direction parallel with an axis p of the torsion bar of the stabilizer bar 2 is defined as "X direction". A direction parallel with a normal line n to a mounting surface 4f of the vehicle-body-side component 4 is defined as "Y direction". A direction perpendicular to the X direction and the Y direction is defined as "Z direction". The X direction coincides with the widthwise direction of a vehicle, but each of the Y direction and the Z direction is determined depending upon a direction of the normal line n to the mounting surface 4f of the vehicle-body-side component 4. In the present embodiment, the direction of the normal line n to the mounting surface 4f coincides with a front and rear direction, i.e., a longitudinal direction of the vehicle, and the Z direction coincides with the up and down direction, i.e., a height direction of the vehicle.

First Embodiment

Figure 2:
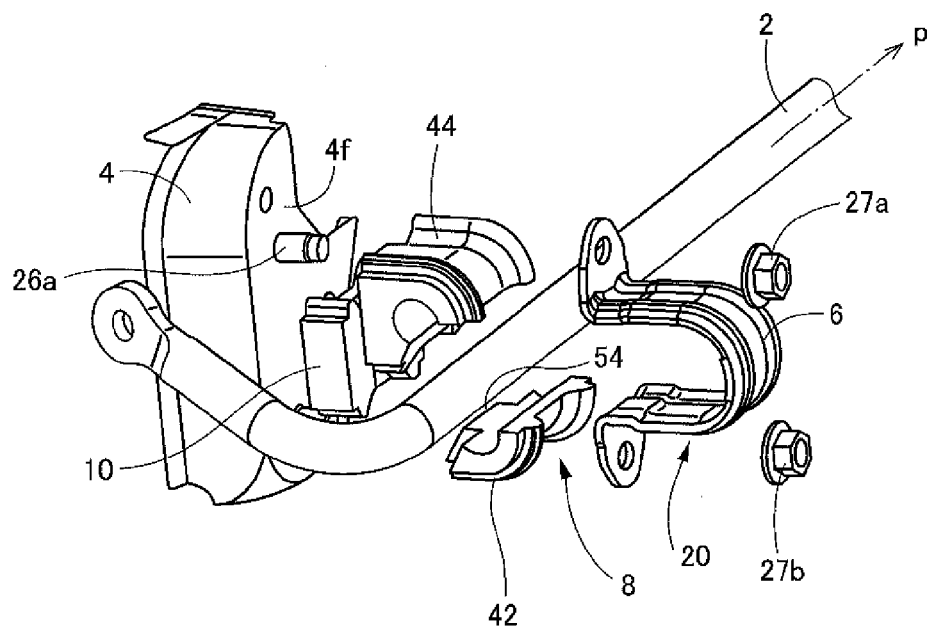
FIG. 2 is an exploded perspective view of the bar mounting device.
Figure 3:
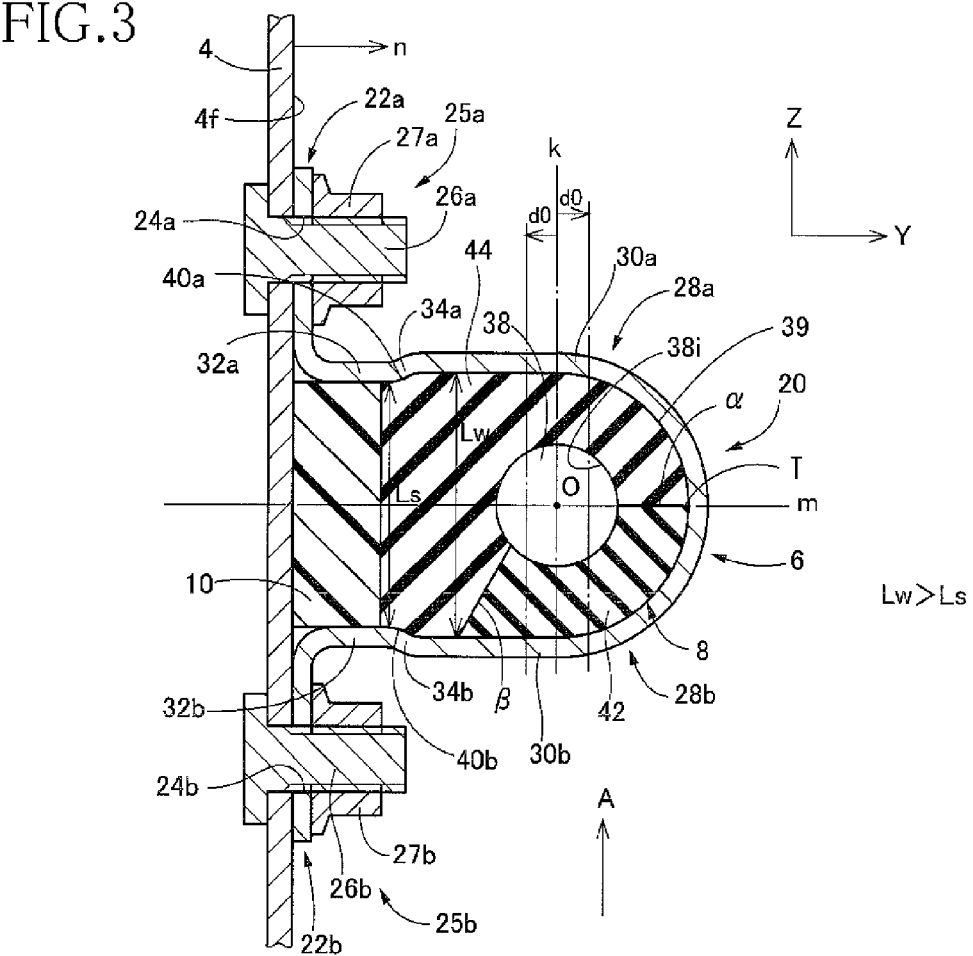
FIG. 3 is a cross-sectional view of the bar mounting device.

As illustrated in FIGS. 2 and 3, the bracket 6 includes: a recessed portion 20 for accommodating the bushing 8; and a pair of flange portions 22a, 22b respectively provided on opposite sides of the recessed portion 20. Each of the pair of flange portions 22a, 22b is one example of a mount portion. The flange portions 22a, 22b respectively have mounting holes 24a, 24b and to be mounted on the vehicle-body-side component 4 respectively by fastening devices 25a, 25b. Specifically, the bracket 6 is mounted on the vehicle-body-side component 4 using nuts 27a, 27b in a state in which bolts 26a, 26b are fitted through the respective mounting holes 24a, 24b.

The recessed portion 20 has a pair of opposed portions 28a, 28b. The distance between the opposed portions 28a, 28b in the Z direction gradually increases, is kept constant, decreases, and then is kept constant from the top of the bracket 6 toward the flange portions 22a, 22b. In other words, the pair of opposed portions 28a, 28b include: wide surface portions 30a, 30b at which the distance between the pair of opposed portions 28a, 28b is relatively long; narrow surface portions 32a, 32b at which the distance between the pair of opposed portions 28a, 28b is relatively short; and stepped surface portions 34a, 34b between the wide surface portions 30a, 30b and the narrow surface portions 32a, 32b. Each of the wide surface portions 30a, 30b is one example of an intermediate portion. It is also possible to consider that portions of the bracket 6 near the stepped surface portions 34a, 34b constitute a narrow portion.

As illustrated in FIGS. 2 and 3, the bushing 8 is a tubular member formed of an elastic material such as rubber. The bushing 8 has a holding hole 38 extending in a direction parallel with the axis p. In the present embodiment, the axis of the holding hole 38 (coinciding with the axis of the bushing 8) coincides with the axis p of the stabilizer bar 2. The cross section of the bushing 8 which is perpendicular to the axis p is shaped such that an outer surface 39 of the bushing 8 has a generally U-shape, and the bushing 8 is symmetric with respect to a reference plane m that extends through a top T of the bushing 8 and a central axis O that extends through the center of the holding hole 38. The bushing 8 has a pair of inclined surface portions 40a, 40b located near an end portion of the bushing 8 which is located on an opposite side of the holding hole 38 from the top T of the bushing 8. The width of the bushing 8 in a direction perpendicular to the reference plane m is less at the end portion of the bushing 8 than at a portion of the bushing 8 which is located nearer to the top T than the inclined surface portions 40a, 40b. That is, as illustrated in FIG. 3, the length Ls is less than the length Lw. The inclined surface portions 40a, 40b are respectively opposed to the stepped surface portions 34a, 34b of the bracket 6 in a state in which the bushing 8 is fitted in the recessed portion 20 of the bracket 6.

The bushing 8 includes two partial bushings 42, 44 shaped by cutting the bushing 8 along separation surfaces α, β. Each of the separation surfaces α, β extends over the entire length of the bushing 8 in an axial direction thereof so as to reach opposite end surfaces of the bushing 8 in the axial direction. The separation surfaces α, β have respective one end portions gα, gβ and the respective other end portions hα, hβ. In other words, it is possible to consider that each of the separation surfaces α, β is the same as corresponding facing surfaces of the two partial bushings 42, 44 in a state in which the two partial bushings 42, 44 are aligned and joined together. In the present specification, each of the separation surfaces α, β is regarded as an imaginary surface for dividing the two partial bushings 42, 44. Each of the one end portions gα, gβ (see FIGS. 5A and 5B) is located at an inner circumferential surface 38i of the holding hole 38 in which the stabilizer bar 2 is held. Each of the other end portions hα, hβ is located at the outer surface 39.

There will be explained the separation surfaces α, β with reference to FIGS. 5A and 5B.

Figure 5A:
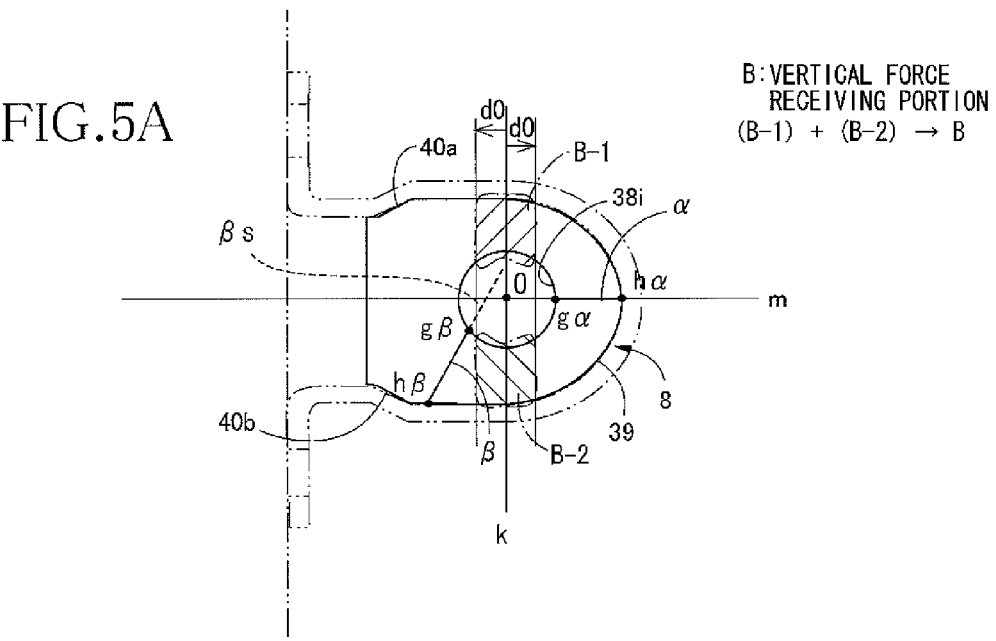
FIGS. 5A and 5B are views each conceptually illustrating the bushing.

Each of the separation surfaces α, β is formed at a portion of the bushing 8 which is different from a portion B of the bushing 8 illustrated in FIG. 5A (Condition 1). The portion B contains the central axis O of the holding hole 38. The distance between any point of the portion B and an up-down center plane k extending in the up and down direction is less than or equal to a set distance d0. The portion B receives a large up-down force due to a twist of the stabilizer bar 2, and the portion B may be hereinafter referred to as "up-down-force receiving portion". If a separation surface is formed at the up-down-force receiving portion B, the separation surface may be deformed (noted that one example of this deformation is opening of the bushing 8 at one end portion g or the other end portion h of the separation surface), leading to deterioration of basic characteristics of the bushing 8 such as a spring constant. In contrast, in the case where the separation surface is formed at the portion of the bushing 8 which is different from the up-down-force receiving portion B, this construction reduces deterioration of the basic characteristics of the bushing 8 due to formation of the separation surface, thereby reliably achieving the function of the stabilizer bar 2. Also, this construction reduces lowering of the durability of the bushing 8. As illustrated in FIG. 5A, the up-down-force receiving portion B includes a portion B-1 located over the holding hole 38 and a portion B-2 located under the holding hole 38.

Figure 5B:
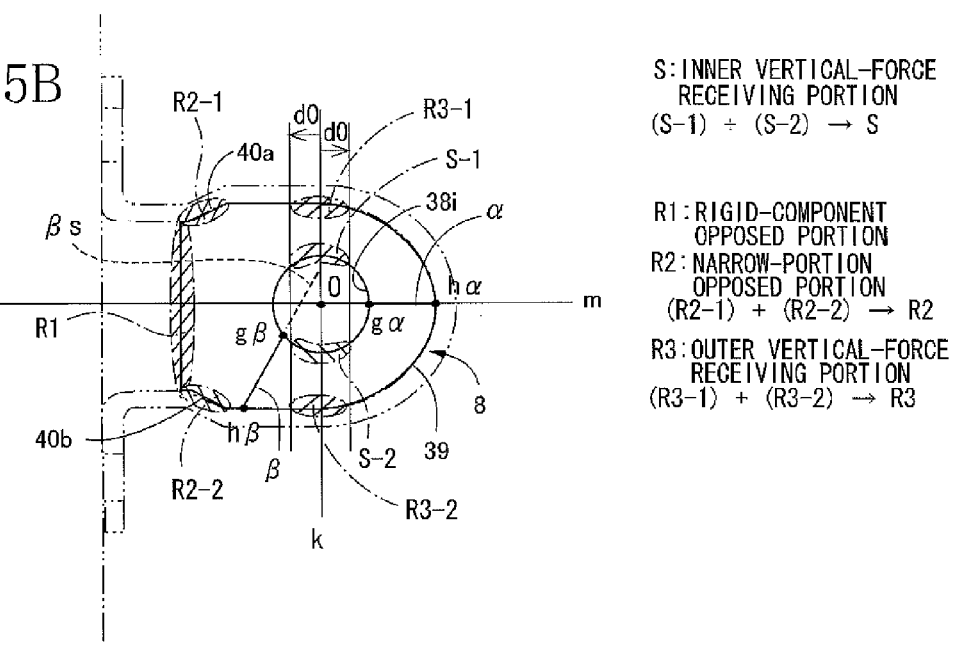

The one end portion g is formed at a portion of the bushing 8 which is different from a portion S of the bushing 8 illustrated in FIG. 5B (Condition 2). The portion S is a portion of the inner circumferential surface 38i of the holding hole 38 formed in the bushing 8. The distance between any point of the portion S and the up-down center plane k is less than or equal to the set distance d0. The portion S may be hereinafter referred to as "inner up-down-force receiving portion". This inner up-down-force receiving portion S receives a large force from the stabilizer bar 2 when the stabilizer bar 2 is twisted in the state in which the stabilizer bar 2 is held in the holding hole 38. The inner up-down-force receiving portion S includes a portion S-1 located over the holding hole 38 and a portion S-2 located under the holding hole 38.

The other end portion h is formed at a portion of the bushing 8 which is different from portions R1-R3 of the bushing 8 illustrated in FIG. 5B (Condition 3).

The portion R1 is a rigid-component opposed portion of the outer surface 39 which is opposed to the base 10 (Condition 3-1). The bushing 8 is fastened to the vehicle-body-side component 4 by the bracket 6 via the base 10. The bushing 8 in most cases has an interference in the Y direction. Thus, the portion R1 of the bushing 8 which is opposed to the base 10 is compressed by, e.g., the base 10 and the bracket 6 in the Y direction. If the other end portion h is provided at the portion R1, the other end portion h receives a large force from the base 10, which may cause opening of the bushing 8 as one example of deformation of the separation surface. In contrast, in the case where the other end portion h is provided at a portion of the outer surface 39 which is different from the rigid-component opposed portion R1, it is possible to prevent occurrences of the opening of the bushing 8 due to the compressive force in the Y direction, resulting in reduction in the lowering of the durability of the bushing 8. It is noted that the opening of the bushing 8 is separation of the surfaces of the two partial bushings 42, 44 which are in contact with each other. Also, the deformation of the separation surface is deformation of the two partial bushings 42, 44 in the same manner or different manners.

The portion R2 is a restrictor opposed portion (the pair of inclined surface portions 40a, 40b) opposed to the stepped surface portions 34a, 34b of the bracket 6 (Condition 3-2). The bushing 8 is in some cases transferred in a state in which the bushing 8 is bonded to the stabilizer bar 2 and held in the recessed portion 20 of the bracket 6. In these cases, each of the pair of stepped surface portions 34a, 34b of the bracket 6 functions as a retainer for retaining the bushing 8. If the separation surface is formed such that the other end portion h is provided at any of the inclined surface portions 40a, 40b (corresponding to the portion R2) opposed to the respective stepped surface portions 34a, 34b, it is difficult for the pair of stepped surface portions 34a, 34b to fully function as the retainer. If the separation surface is formed such that the other end portion h is provided at a portion of the bushing 8 (which corresponds to the rigid-component opposed portion R1) between the pair of inclined surface portions 40a, 40b, i.e., between a portion R2-1 and a portion R2-2, the two partial bushings 42, 44 are easily displaced from each other at the separation surface. In contrast, in the case where the separation surface is formed such that the other end portion h is provided at a portion of the outer surface 39 which is different from each of the narrow-portion opposed portion R2 and the rigid-component opposed portion R1, the partial bushings 42, 44 are not easily displaced from each other. The narrow-portion opposed portion R2 includes the portion R2-1 and the portion R2-2 respectively corresponding to the pair of inclined surface portions 40a, 40b.

The portion R3 is an outer up-down-force receiving portion. The distance between any point of the outer up-down-force receiving portion R3 and the up-down center plane k is less than or equal to the set distance d0 (Condition 3-3). The outer up-down-force receiving portion R3 receives a reaction force against the bracket 6 which is an up-down force produced due to twist of the stabilizer bar 2. Thus, the separation surface is preferably formed in a state in which the other end portion h is not located at the outer up-down-force receiving portion R3. The outer up-down-force receiving portion R3 includes an upper portion R3-1 and a lower portion R3-2 of the outer surface 39.

The separation surface β is provided on one of opposite sides of the up-down center plane k which is nearer to the rigid-component opposed portion (Condition 4). The separation surface α is provided on the other of the opposite sides of the up-down center plane k which is nearer to the top T. Accordingly, the separation surface β is provided on an opposite side of the up-down center plane k from the separation surface α. This construction facilitates mounting of the bushing 8 on the stabilizer bar 2.

An extended surface βs extended from the separation surface β does not pass through the central axis O of the holding hole 38 (Condition 5). The separation surface β is inclined with respect to a radial direction of the holding hole 38, making it difficult for the separation surface β to receive a large force from the stabilizer bar 2.

In the present embodiment, the separation surface α satisfies the above-described Conditions 1-3, and the separation surface β satisfies the above-described Conditions 1-5. The separation surface α is formed along the reference plane m so as to extend in the front and rear direction Y. The one end portion gα is provided on the inner circumferential surface 38i of the holding hole 38 at a position spaced apart from the up-down center plane k at a distance of greater than or equal to the distance d0. The other end portion hα is provided at the top T of the outer surface 39. The separation surface β is inclined with respect to the up and down direction Z and the front and rear direction Y. The one end portion gβ is provided on the inner circumferential surface 38i of the holding hole 38 at a position nearer to the rigid-component opposed portion R1 than the inner up-down-force receiving portion S. The other end portion hβ is provided nearer to the rigid-component opposed portion R1 than the one end portion gβ. In the present embodiment, the separation surfaces α, β are asymmetric with respect to the reference plane m. Even in the case where the separation surface α is located on the reference plane m, it is considered that the two separation surfaces are asymmetric with respect to the reference plane m.

As thus described, the two partial bushings 42, 44 shaped so as to be divided by the separation surfaces α, β differ from each other in size and shape. In the present embodiment, the partial bushing 42 includes the rigid-component opposed portion R1 and the narrow-portion opposed portion R2. The partial bushings 42, 44 are to be mounted on an outer circumferential surface of the stabilizer bar 2, and each of the partial bushings 42, 44 may have a shape and a size determined based on, e.g., an operating state of robots and may have a shape for easy molding, for example. It is noted that since the partial bushings 42, 44 are assembled to each other in a state in which the partial bushings 42, 44 are opposed to each other at the separation surfaces α, β, the separation surfaces α, β may be respectively referred to as contact surfaces α, β at which the two partial bushings 42, 44 are to be in contact with each other.

The base 10 is a rigid component formed of resin or metal and provided between the bushing 8 and the vehicle-body-side component 4. Providing the base 10 increases the distance between the stabilizer bar 2 and the vehicle-body-side component 4 and prevents the bushing 8 from having an excessively large volume, resulting in increase in supporting rigidity of the stabilizer bar 2.

Figure 4:
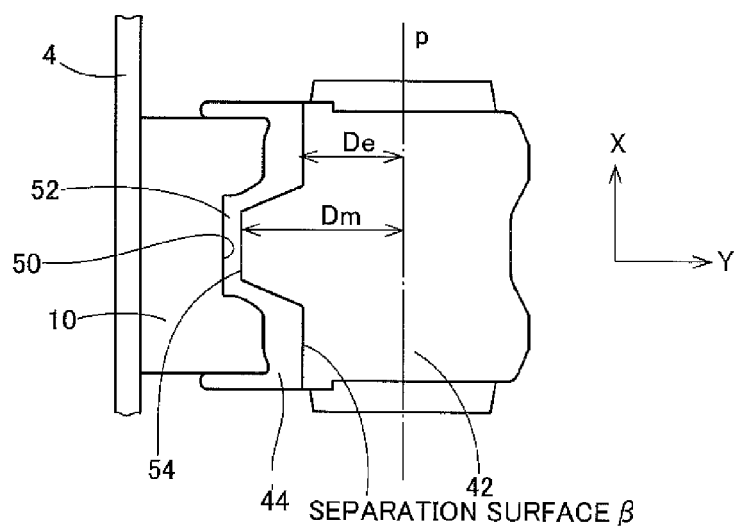
FIG. 4 is a view illustrating the bar mounting device in FIG. 3 when viewed in a direction directed by the arrow A in FIG. 3.

The base 10 has a recessed portion 50 formed at a central portion of the base 10 in the axial direction. The recessed portion 50 is recessed toward the vehicle-body-side component 4. As illustrated in FIG. 4, the bushing 8 has a protruding portion 52 formed in a central portion of the bushing 8 in a direction parallel with the axis p. The protruding portion 52 is fitted in the recessed portion 50, thereby preventing movement of the bushing 8 and the base 10 relative to each other in the direction parallel with the axis p. To match the shape of the protruding portion 52 of the bushing 8, an intermediate portion of the separation surface β in the axial direction is bent in a direction away from the holding hole 38 so as to form a protrusion 54. As a result, the intermediate portion of the separation surface β is farther from the holding hole 38 than end portions of the separation surface β. In other words, a distance Dm between the central axis O of the holding hole 38 and the intermediate portion of the separation surface β is greater than a distance De between the central axis O of the holding hole 38 and each of the end portions of the separation surface β (Dm>De). This construction makes it more difficult for the separation surface β to receive the up-down force produced due to the twist of the stabilizer bar 2.

There will be next explained the case where the stabilizer bar 2 is mounted on the vehicle-body-side component 4. The partial bushings 42, 44 are bonded to the stabilizer bar 2 in advance and fitted in the recessed portion 20 of the bracket 6. The bushing 8 includes the plurality of partial bushings 42, 44, making it easy to mount the bushing 8 on the stabilizer bar 2. The bushing 8 is transferred in some cases in the state in which the bushing 8 is fitted in the recessed portion 20 of the bracket 6. However, the partial bushing 44 is provided in an open portion of the recessed portion 20, i.e., between the stepped surface portions 34a, 34b, so that the other end portions hα, hβ of the respective separation surfaces α, β are not located in the open portion of the recessed portion 20. This construction makes it difficult for the bushing 8 from being disengaged from the recessed portion 20 in transferring. Also, this construction reduces occurrences of displacement of the two partial bushings 42, 44 at the separation surface.

The base 10 is provided between the bushing 8 and the vehicle-body-side component 4. The bushing 8 is mounted on the vehicle-body-side component 4 in the state in which the bushing 8 is compressed by the bracket 6 in the direction along the normal line n. With this construction, the other end portions hα, hβ of the respective separation surfaces α, β are not located at the rigid-component opposed portion R1, thereby preventing the opening of the bushing 8 at the separation surface, making it possible to reduce the lowering of the durability of the bushing 8. When the stabilizer bar 2 is twisted in this state, an up-down force acts on the bushing 8. However, the separation surfaces α, β of the bushing 8 are not provided at the up-down-force receiving portion B, making it difficult for a large up-down force to act on the separation surfaces α, β due to the twist of the stabilizer bar 2, resulting in reduction in deformation of the separation surfaces α, β. Accordingly, even when the separation surfaces α, β are formed, it is difficult to cause deterioration of the basic characteristics of the bushing 8, thereby reliably achieving the function of the stabilizer bar 2.

It is noted that in the case where each of the bushings disclosed in Patent Documents 3, 4 is mounted on a mounting surface of a vehicle-body-side component with a normal line n to the mounting surface extending in the front and rear direction, the separation surface is unpreferably located at the up-down-force receiving portion B. Also, the separation surface formed in the bushing disclosed in Patent Document 2 is provided in a state in which the other end portion h is located at the rigid-component opposed portion R1. As a result, the separation surface may be deformed, leading to deterioration of basic characteristics of the bushing, for example. Patent Documents 1-5 fail to suggest a position of formation of the separation surface in the case where the bushing is mounted on the mounting surface of the vehicle-body-side component, with the normal line n being inclined with respect to the up and down direction. Accordingly, the present disclosure possesses novelty and inventiveness over Patent Documents 1-5.

In the present embodiment, the separation surface α is one example of a second separation surface, and the separation surface β is one example of a first separation surface.

It is noted that the base 10 is not essential. In the case where the base 10 is not provided, a portion of the bushing 8 which is opposed to the vehicle-body-side component 4 corresponds to the rigid-component opposed portion R1. The base has any shape. For example, it is not essential to form the recessed portion 50 at the central portion of the base in the axial direction. Also, it is not essential that the bracket 6 has the narrow portion. For example, there is small need to provide the narrow portion in the case where the bushing 8 is not transferred in the state in which the bushing 8 is fitted in the recessed portion 20 of the bracket 6, for example. The bushing 8 may include three or more partial bushings and may have a single separation surface, for example. Also, it is not essential that the two partial bushings 42, 44 are bonded to the stabilizer bar 2. The stabilizer bar 2 may be mounted on the vehicle-body-side component 4 in a state in which the two partial bushings 42, 44 are not bonded to the stabilizer bar 2.

Second Embodiment

Figure 6:
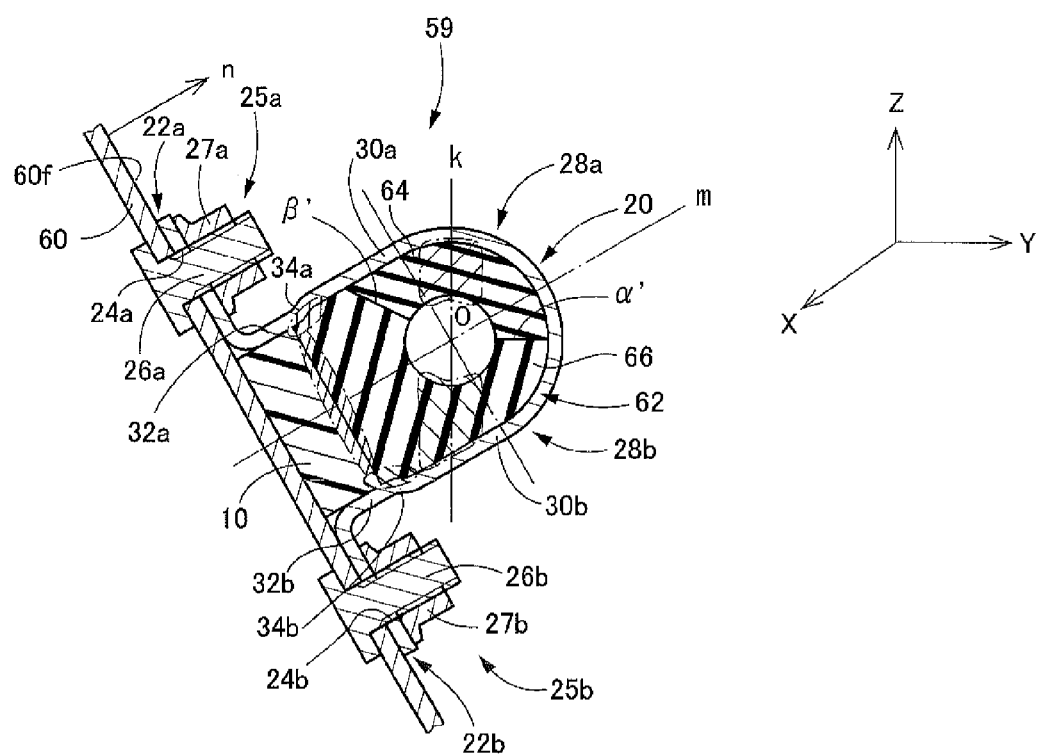
FIG. 6 is a cross-sectional view of a bar mounting device according to a second embodiment which includes a bushing according to a second embodiment.

FIG. 6 illustrates one example of a bar mounting device 59 according to a second embodiment. In this bar mounting device 59, as illustrated in FIG. 6, the stabilizer bar 2 is mounted on a mounting surface 60f of a vehicle-body-side component 60 via a bushing 62. A normal line n to the mounting surface 60f is inclined with respect to the front and rear direction and the up and down direction. The bushing 62 includes two partial bushings 64, 66 shaped so as to be divided by two separation surfaces α', β'. The separation surface α' extends in the front and rear direction Y. The separation surface β' is inclined with respect to the up and down direction Z and the front and rear direction Y. These separation surfaces α', β' are asymmetric with respect to the reference plane m. The separation surface α' satisfies the above-described Conditions 1-3, and the separation surface β' satisfies the above-described Conditions 1-4. Thus, the separation surface β' as another example of the first separation surface may not satisfy the above-described Condition 5.

Modifications

The position of the separation surface in the bushing is not limited to those in the first and second embodiments. For example, the separation surface may be formed in a state in which the other end portion h is located at the portion R2. The separation surface may be parallel to the up and down direction. The two separation surfaces may be symmetric with respect to the reference plane m, and FIGS. 7A-7D illustrate modifications of this kind.

Figure 7A:
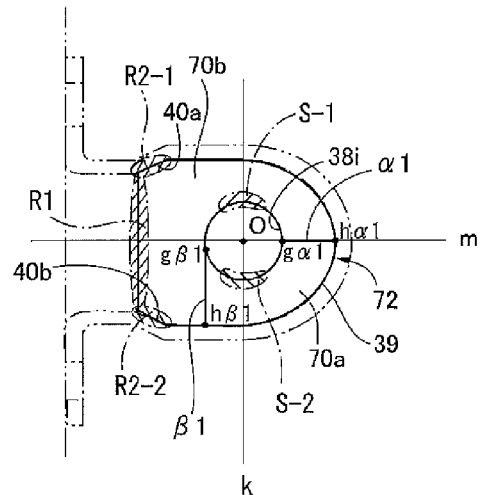
FIGS. 7A through 7C are views conceptually illustrating bushings according to modifications.

FIG. 7A illustrates a bushing 72 including two partial bushing 70a, 70b shaped so as to be divided by separation surfaces α1, β1. The separation surface α1 extends in the front and rear direction like the separation surface α in the first embodiment. The separation surface β1 extends in the up and down direction. One end portion gβ1 is displaced from the inner up-down-force receiving portion S. The other end portion hβ1 is located on the outer surface 39 at a position different from the rigid-component opposed portion R1.

Figure 7B:
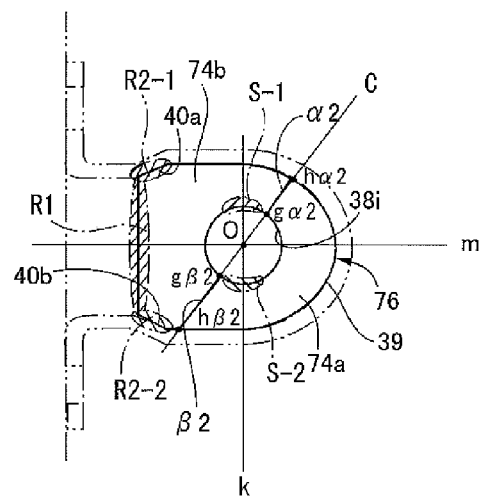

FIG. 7B illustrates a bushing 76 including two partial bushings 74a, 74b shaped so as to be divided by separation surfaces α2, β2. The separation surfaces α2, β2 extend through the central axis O of the holding hole 38 and are located on the same plane C that extends along the diameter of the holding hole 38. One end portions gα2, gβ2 of the respective separation surfaces α2, β2 are opposed to each other along the diameter of the holding hole 38. The other end portion hβ2 of the separation surface β2 is located on the outer surface 39 at a position different from the rigid-component opposed portion R1.

Figure 7C:
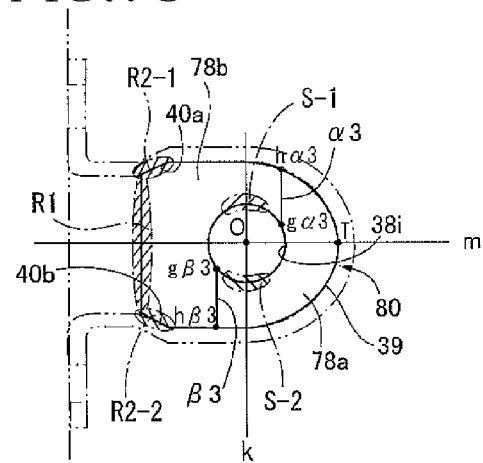

FIG. 7C illustrates a bushing 80 including two partial bushings 78a, 78b shaped so as to be divided by separation surfaces α3, β3. Each of the separation surfaces α3, β3 extends in a direction parallel with the up and down direction. One end portion gα3 of the separation surface α3 is located on the inner circumferential surface 38i at a position nearer to the top T than the inner up-down-force receiving portion S. One end portion gβ3 of the separation surface β3 is located on the inner circumferential surface 38i at a position nearer to the rigid-component opposed portion than the inner up-down-force receiving portion S. The other end portion hβ3 is located on the outer surface 39 at a position different from the rigid-component opposed portion R1.

Figure 7D:
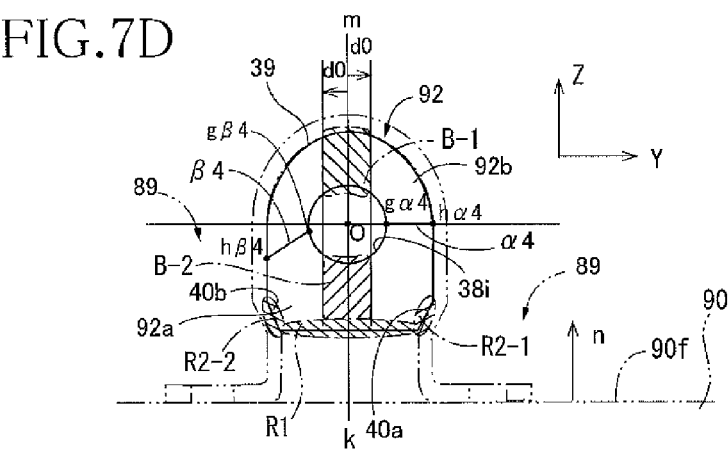
FIG. 7D is a view conceptually illustrating a bar mounting device according to a modification which includes a bushing according to a modification.

FIG. 7D illustrates a state in which a stabilizer bar is mounted on a mounting surface 90f of a vehicle-body-side component 90 by a bar mounting device 89. A normal line n to the vehicle-body-side component 90 extends in the up and down direction Z. The bushing 92 includes partial bushings 92a, 92b shaped so as to be divided by separation surfaces α4, β4. In this modification, the rigid-component opposed portion R1 includes a portion of the outer up-down-force receiving portion. Each of the separation surfaces α4, β4 is located at a portion of the bushing 92 which is different from the up-down-force receiving portion B. Each of one end portions gα4, gβ4 is located on the inner circumferential surface 38i at a position different from the inner up-down-force receiving portion. Each of the other end portions hα4, hβ4 is located on the outer surface 39 at a position different from each of the rigid-component opposed portion R1 and the narrow-portion opposed portion R2. The other end portions hα4, hβ4 are asymmetric with respect to the reference plane. The separation surface α4 is formed along the front and rear direction Y. The separation surface β4 is inclined with respect to the up and down direction Z and the front and rear direction Y.

In the bar mounting device disclosed in Patent Document 5, two separation surfaces are symmetric with respect to a reference plane for the bushing. These two separation surfaces differ from the separation surfaces α4, β4 in the present modification.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

What is claimed is:

1. A stabilizer bushing, comprising:
a holding hole extending in an axial direction of the stabilizer bushing,
wherein the stabilizer bushing is configured to hold a stabilizer bar in the holding hole,
wherein the stabilizer bushing is to be mounted on a mounting surface of a vehicle-body-side component,
wherein a normal line to the mounting surface extends in a direction intersecting an up and down direction of a vehicle,
wherein the stabilizer bushing comprises a plurality of separation surfaces,
wherein an inner end portion of each of the plurality of separation surfaces is located on an inner circumferential surface opposed to the holding hole in a state in which the stabilizer bushing is mounted on the vehicle-body-side component,
wherein an outer end portion of each of the plurality of separation surfaces is located on an outer surface of the stabilizer bushing at a position different from a rigid-component opposed portion opposed to the vehicle-body-side component in the state in which the stabilizer bushing is mounted on the vehicle-body-side component,
wherein the plurality of separation surfaces comprise:
a first separation surface including a first inner end portion as the inner end portion and a first outer end portion as the outer end portion which are located nearer to the rigid-component opposed portion than a plane that extends through a central axis of the holding hole and that is parallel with the rigid-component opposed portion, and
a second separation surface including a second inner end portion as the inner end portion and a second outer end portion as the outer end portion which are located on an opposite side of the plane from the rigid-component opposed portion, and
wherein the first separation surface extends in a straight line from the first outer end portion to the first inner end portion, and the straight line continues to extend from the first inner end portion of the first separation surface into the holding hole with the straight line being spaced apart from the central axis.

2. The stabilizer bushing according to claim 1, wherein the second separation surface extends in a direction perpendicular to the up and down direction.

3. The stabilizer bushing according to claim 1,
wherein the stabilizer bushing is to be mounted on the vehicle-body-side component via a rigid component,
wherein the rigid component comprises a recessed portion formed in an intermediate portion of the rigid component in the axial direction,
wherein the stabilizer bushing comprises a bushing protruding portion protruding in a direction away from the holding hole so as to match the recessed portion of the rigid component, and
wherein the first separation surface protrudes at a portion thereof which corresponds to the bushing protruding portion.

4. The stabilizer bushing according to claim 1,
wherein the plurality of separation surfaces are comprised in the stabilizer bushing, and
wherein the stabilizer bushing comprises a plurality of partial bushings defined by the plurality of separation surfaces.

5. The stabilizer bushing according to claim 1,
wherein the stabilizer bushing is symmetric with respect to a reference plane extending in a direction intersecting the axial direction,
wherein the stabilizer bushing comprises at least two partial bushings contactable with each other at at least two separation surfaces as the plurality of separation surfaces of the stabilizer bushing, and
wherein the at least two separation surfaces are asymmetric with respect to the reference plane.

6. A stabilizer-bar mounting device, comprising:
the stabilizer bushing according to claim 1; and
a bracket comprising (i) a recessed portion capable of accommodating the stabilizer bushing and (ii) a mount portion that is to be mounted on the vehicle-body-side component,
wherein the recessed portion of the bracket comprises a pair of opposed portions opposed in a direction perpendicular to the axial direction, and
wherein a distance between portions of the bracket which are nearer to the mount portion than intermediate portions of the pair of opposed portions is less than a distance between the intermediate portions of the pair of opposed portions.

7. The stabilizer-bar mounting device according to claim 6,
wherein the bracket comprises a pair of stepped surface portions between (i) the intermediate portions and (ii) the portions of the bracket which are nearer to the mount portion than the intermediate portions of the pair of opposed portions,
wherein a distance between the pair of opposed portions changes at the pair of stepped surface portions,
wherein the stabilizer bushing further comprises a pair of inclined surface portions provided at a portion of the outer surface which corresponds to the pair of stepped surface portions of the bracket in a state in which the stabilizer bushing is accommodated in the recessed portion of the bracket, and
wherein the first separation surface is formed in a state in which the first outer end portion is located on the outer surface at a position different from the pair of inclined surface portions.

8. The stabilizer bushing according to claim 1,
wherein the first inner end portion of the first separation surface is located nearer to the rigid-component opposed portion than the plane by an amount greater than or equal to a set distance, and
wherein the first outer end portion of the first separation surface is located nearer to the rigid-component opposed portion than the first inner end portion of the first separation surface.

* * * * *